(12) United States Patent
Suhre et al.

(10) Patent No.: US 6,542,806 B1
(45) Date of Patent: Apr. 1, 2003

(54) OPTIMAL TRACTIVE FORCE CONTROL METHOD FOR GROUND VEHICLES

(75) Inventors: Blake R. Suhre, Neenah, WI (US); Jeffery C. Ehlers, Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 63 days.

(21) Appl. No.: 09/864,804

(22) Filed: May 24, 2001

(51) Int. Cl.[7] .................................................. G06F 7/00
(52) U.S. Cl. ........................................................ 701/82
(58) Field of Search ............................... 701/82, 83, 87, 701/71

(56) References Cited

U.S. PATENT DOCUMENTS

| | | | |
|---|---|---|---|
| 4,598,611 A | 7/1986 | Frank | 74/860 |
| 5,463,551 A | 10/1995 | Milunas | 364/426 |
| 5,737,713 A | 4/1998 | Ikeda et al. | 701/84 |
| 6,002,979 A | 12/1999 | Ishizu | 701/86 |
| 6,061,622 A | 5/2000 | Probst | 701/84 |
| 6,125,314 A | 9/2000 | Graf et al. | 701/53 |
| 6,154,702 A | 11/2000 | Fodor et al. | 701/71 |

*Primary Examiner*—Yonel Beaulieu
(74) *Attorney, Agent, or Firm*—William D. Lanyi

(57) ABSTRACT

A method is provided for controlling tractive force of a ground vehicle. The method is adaptive to vehicles which have both driven axles and non driven axles or, alternatively, vehicles which have only driven axles. Slip is determined either by comparing the angular velocities of the driven and non driven axles or, alternatively, by monitoring the angular velocity of the driven axle as a function of time to determine an instantaneous angular acceleration. The tractive force command is varied as a function of slip of the driven axle and is increased or decreased relative to the tractive force request provided by the operator in order to most efficiently respond to the operator command.

20 Claims, 3 Drawing Sheets

OPTIMAL TRACTIVE FORCE CONTROL METHOD FOR GROUND VEHICLES

BACKGROUND OF THE INVENTION

1. Field of the Invention

The present invention is generally related to a method for controlling the tractive force of a ground vehicle and, more particularly, to a method for controlling the degree of slip between a driven wheel or tread and the ground.

2. Description of the Prior Art

Many different types of traction control systems are known to those skilled in the art. U.S. Pat. No. 6,154,702, which issued to Fodor et al on Nov. 28, 2000, describes a method and apparatus for estimating applied wheel torque in a motor vehicle. The vehicle traction control system is controlled in part by a signal value indicative of estimated wheel torque. The estimated wheel torque value is produced within the vehicle's electronic engine control module by summing a first value which indicated the estimated torque attributable to engine combustion and a second value which is proportional to engine acceleration/deceleration which indicates the amount of torque attributable to the inertial movement of engine and drive train masses.

U.S. Pat. No. 4,598,611, which issued to Frank on Jul. 8, 1986, describes a low power control system and method for a power delivery system having a continuously variable ratio transmission. The control system and method for a power delivery system, such as that of an automotive vehicle, has an engine coupled to a continuously variable ratio transmission. Independent control of engine and transmission enable the engine to precisely follow a desired operating characteristic, such as the ideal operating line for low fuel consumption. Engine fuel requirements, such as throttle position, are a function of at least measured engine speed, and are adjusted in accordance with any load placed on the engine so that, during low power operation, fuel flow is increased when a decrease in operating speed occurs, and fuel flow is reduced when an increase in operating speed occurs.

U.S. Pat. No. 6,125,314, which issued to Graf et al on Sep. 26, 2000, describes a drive train controller for a motor vehicle. The controller is used to calculate the position of the accelerator pedal which is interpreted as the wheel torque or transmission output torque desired by the driver, in order to calculate setpoint values for the torque to be output by the drive train. It contains a control circuit in which the desired wheel torque is evaluated, together with further operating parameters of the motor vehicle, in a fuzzy system. It outputs an output signal by which the wheel torque to be exerted on the roadway by the wheels of a motor vehicle is defined.

U.S. Pat. No. 6,061,622, which issued to Probst on May 9, 2000, describes a circuit configuration for controlling torque transmitted between driven wheels of a motor vehicle and a roadway. The circuit configuration for controlling engine torque transmitted to a roadway through driven wheels of a motor vehicle includes a device for wheel-selective slop value detection and for determining a representative wheel slip, a device for specifying a set point slip, and an engine controller that takes a slip status into account. The engine controller is preceded by a regulator, to which a difference between the set point slip and the representative wheel slip is supplied as a control difference. A feedback signal characterizing the current engine torque is sent from the engine controller to the regulator.

U.S. Pat. No. 6,002,979, which issued to Ishizu on Dec. 14, 1999, describes a traction control system for automotive vehicles. The system includes a traction control unit for calculating a slip amount as the difference between a drive wheel speed and a target drive wheel speed, an engine control unit cooperating with a fuel supply system for decreasingly compensating the engine power by the fuel out control action in response to the slip amount, and a temperature sensor for detecting an internal combustion engine temperature. The traction control unit is responsive to the internal combustion engine temperature for properly setting the target drive wheel speed or for properly setting control gains of the engine control system so that the engine speed is maintained above a minimum internal combustion engine revolution speed at which engine stall is prevented.

U.S. Pat. No. 5,737,713, which issued to Ikeda et al on Apr. 7, 1998, describes a traction control system for a vehicle. An initial engine torque for a traction control is selected from the following engine torques: an engine torque calculated from a throttle opening degree and an engine revolution number; a required engine torque calculated from a total acceleration and a vehicle speed; and an engine torque corresponding to a road surface of an extremely low friction coefficient, depending upon a slipping state determined by comparing a driven wheel speed with slip reference values.

U.S. Pat. No. 5,463,551, which issued to Milunas on Oct. 31, 1995, describes an integrated traction control system. The approach provides for smooth and precise control of engine output torque to reduce slip of the driven wheels during acceleration thereof through an integrated control of engine ignition timing and engine fueling in automotive vehicles regardless of the type of transmission used in the vehicle. In the presence of a slip condition at the vehicle driven wheels, ignition timing is adjusted to attempt to alleviate the condition.

U.S. patent application Ser. No. 09/452,797 which was filed by Suhre on Dec. 2, 1999 and is now abandoned, discloses a propeller pitch selection method for a controllable pitch propeller. A propeller blade pitch selection method receives input signals from a manually controlled input, such as a throttle handle, and from a device that measures the velocity of a marine vessel. This can be provided by a speedometer or a GPS system. The vessel velocity can be measured relative to the water in which the vessel is operated or, alternatively, relative to a fixed position on earth. Using the two inputs of thrust demand from the operator and vessel velocity from the speedometer, the engine control unit selects both a blade pitch angle and an engine torque demand magnitude from stored data and uses the two selective values to set the torque demand of the engine and the blade pitch position of the propeller. An adaptive system is also provided in which steady state conditions allow the ECU, or engine control unit, to make slight incremental changes in blade pitch when the marine vessel is operating under constant thrust conditions so that the ECU can determine if the blade pitch settings are optimal. If an improvement can be achieved by modifying the preselected blade pitch settings, an adaptive matrix is used to add corrective values to the preselected pitch magnitudes.

U.S. Pat. No. 6,298,614 which was filed by Suhre on Feb. 9, 2001 discloses an engine control system using an air and fuel control strategy based on torque demand. A control system for a fuel injected engine provides an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position a throttle plate. No direct connection is provided between a manually manipulated throttle handle and a throttle plate. All operating parameters are either calculated as a function of ambient conditions or determined by selecting parameters from matrices which allow the engine control unit to set the operating parameters as a function of engine speed and torque demand, as represented by the position of throttle handle.

The patents and patent applications described above are hereby explicitly incorporated by reference in the description of the preferred embodiment of the present invention.

SUMMARY OF THE INVENTION

A method of controlling tractive force of a ground vehicle, in accordance with a preferred embodiment of the present invention, comprises the steps of receiving a tractive force request and determining a tractive force command as a fractional portion of the tractive force request. The tractive force request is typically received from a manually controlled foot pedal or a manually controlled hand grip which an operator of the ground vehicle manipulates to provide a tractive force request to an engine control unit. As a function of the tractive force request, the present invention determines a tractive force command which is a fractional portion of the tractive force request. The fractional portion, which can be equal to unity, is determined as a function of certain operational parameters relating to the operation of the ground vehicle, such as magnitude of slip of its driven axle.

A preferred embodiment of the present invention further comprises the steps of determining a rotational velocity of a shaft, or axle, selected from the group consisting of a driven shaft connected in torque transmitting relation with a source of motive power and a non driven shaft which is not connected in torque transmitting relation with said source of motive power. The source of motive power is typically an internal combustion engine or an electric motor. The driven shaft is connected to the engine in order to provide torque to a driven wheel or a driven traction device which is in contact with the ground and provides the thrust for the ground vehicle. The non driven shaft assists in supporting the ground vehicle but does not transmit torque to a wheel or other component. As an example, a two wheel drive automobile typically has two driven wheels which are driven by two driven shafts which are, in turn, driven by an internal combustion engine and transmission. The other two wheels of a two wheel drive vehicle are non drive wheels. The present invention is applicable, in alternative forms, to ground vehicles that have either only driven wheels or a combination of driven and non driven wheels. Throughout the description of the present invention, it should be understood that the driven shafts and non driven shafts are typically connected to wheels in certain wheeled ground vehicles and the driven shafts are typically connected to some type of tractive device, such as a rubber tread, in ground vehicles such as snowmobiles.

A preferred embodiment of the present invention further comprises the steps of selecting a desired gear ratio between the source of motive power and the driven shaft. The desired gear ratio is selected as a function of the tractive force command and the rotational velocity. It should be understood that the present invention is most appropriately used in conjunction with a continuously variable transmission (CVT), but can be used with alternative types of transmissions. It should also be understood that the fractional portion of the tractive force request used to determine the tractive force command is typically equal to 1.00 or less. In other words, under normal conditions when no slip occurs between the driven wheel and the ground, the fractional portion would be generally equal to approximately unity. However, if measurable slip occurs, the fractional portion can be decreased so that the tractive force command is significantly less than the tractive force request provided by the operator of the ground vehicle. The desired gear ratio selected by the present invention represents the gear ratio between one rotational component attached to a driveshaft of the engine and another rotational component attached to the driven shaft of the ground vehicle.

A preferred embodiment of the present invention further comprises the steps of selecting an optimal brake torque magnitude as a function of the tractive force command and a rotational velocity, causing a gear ratio between the source of motive power and the driven shaft of the ground vehicle to be generally equal to the desired gear ratio, causing the engine to provide a brake torque output that is generally equal to the optimal brake torque magnitude, and determining a magnitude of slip between the ground and a driven member attached in torque transmitting relation with the driven shaft. Throughout the description of the present invention, the term "brake torque" shall mean the indicated torque minus both the inertia of the powertrain multiplied by the angular acceleration and the frictional effects. Therefore, when a torque command is issued to the engine, it is generally equal to the brake torque command plus the frictional effect and the powertrain inertia multiplied by the angular acceleration. In other words, the brake torque is the magnitude of torque actually delivered to the axles or treads while the indicated torque is the theoretical torque provided by the engine if no frictional effects or inertia effects existed.

In addition, the present invention comprises the step of changing the fractional portion as a function of the magnitude of slip. In different embodiments of the present invention, the fractional portion is changed as a function of the magnitude of slip in different ways to accommodate the different characteristics of the ground vehicle. In practice, it is likely that the actual magnitude of the fractional portion will not actually be calculated. Instead, it is most likely that an adjusted magnitude of the tractive force command will be determined as a function of certain monitored operating parameters and, as a result, the adjusted tractive force command will be equal to some fractional portion of the tractive force request. The ratio of the tractive force command to the tractive force request is the resulting fractional portion magnitude.

The rotational velocity determined by the present invention can be the rotational velocity of the driven shaft or non driven shaft, depending on the type of ground vehicle used in conjunction with the present invention. If the rotational velocity is that of the driven shaft, such as in a snowmobile application or a four wheel drive application, the present invention further comprises the steps of measuring elapsed time and determining a rotational acceleration of the driven shaft as a function of the rotational velocity of the driven shaft and the elapsed time. In other words, knowing the velocity at various instance of time allows the system to calculate the change in velocity, or acceleration, during a preselected period. The present invention comprises the steps of selecting an upper acceleration limit magnitude as a function of the tractive force command and the rotational velocity of the driven shaft and comparing the rotational acceleration of the driven shaft to the upper acceleration limit magnitude. The present invention then changes the fractional portion as a function of the relative magnitudes of the rotational acceleration of the driven shaft and the upper acceleration limit magnitude. In a preferred embodiment of the present invention, the desired gear ratio, the optimum brake torque magnitude, the upper acceleration limit magnitude, and the upper slip limit magnitude are selected from two dimensional arrays in which values for these parameters are arranged as a function of the tractive force command and the rotational velocity of either the driven shaft or the non driven shaft.

The rotational velocity determining step can comprise the individual steps of determining a rotational velocity of the driven shaft and determining the rotational velocity of the non driven shaft. An upper slip limit magnitude is selected as a function of the tractive force command and the rotational velocity of the non driven shaft and a slip value is calculated as a function of the rotational velocity of the driven and non driven shafts. The present invention then compares the slip value to the upper slip limit magnitude and changes the fractional portion as a function of the relative magnitudes of the slip value to the upper slip limit magnitude.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
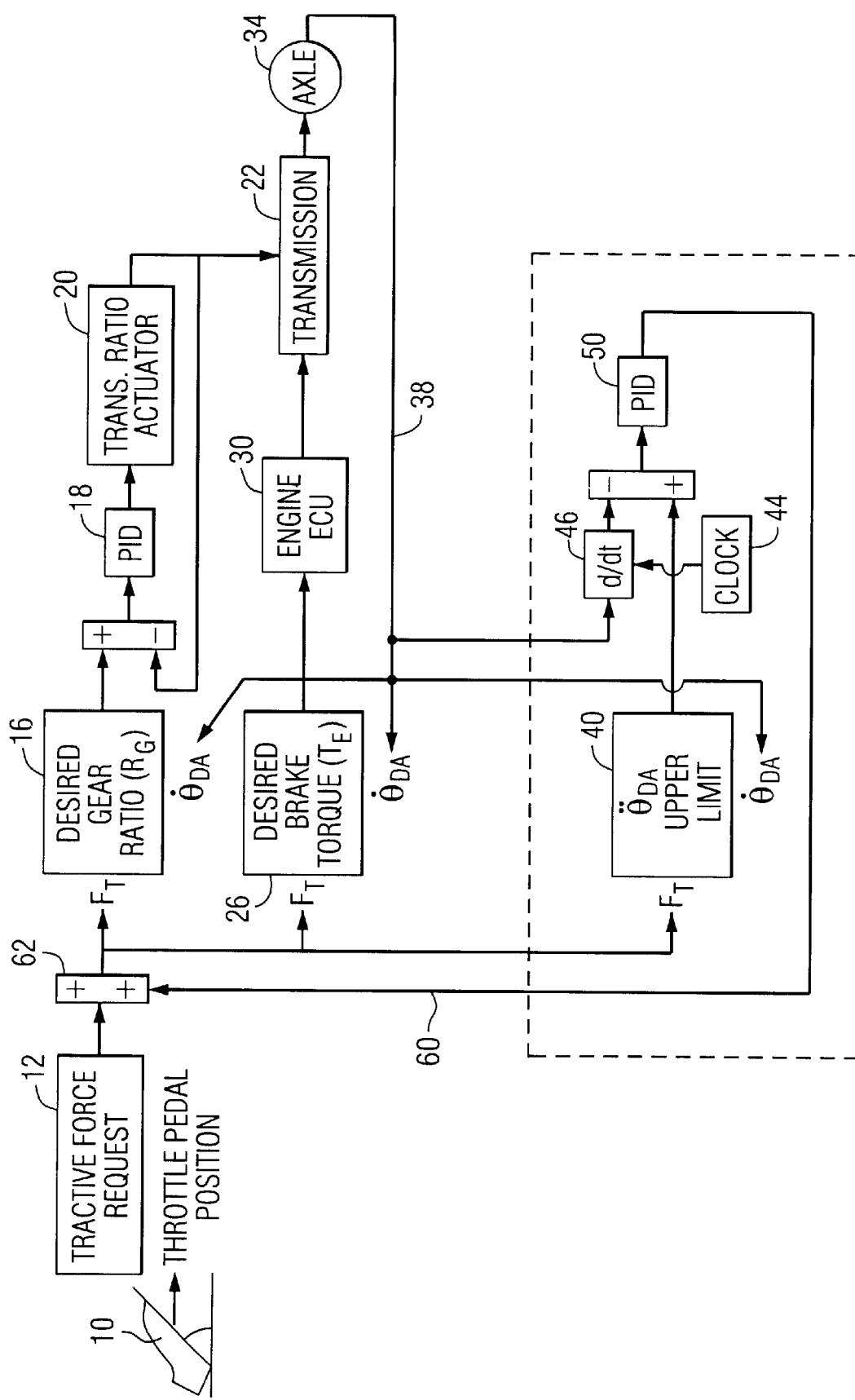
FIG. 1 illustrates a control scheme for ground vehicles without a ground speed measurement device.

Throughout the description of the preferred embodiment of the present invention, like components will be identified by like reference numerals.

Figure 2:
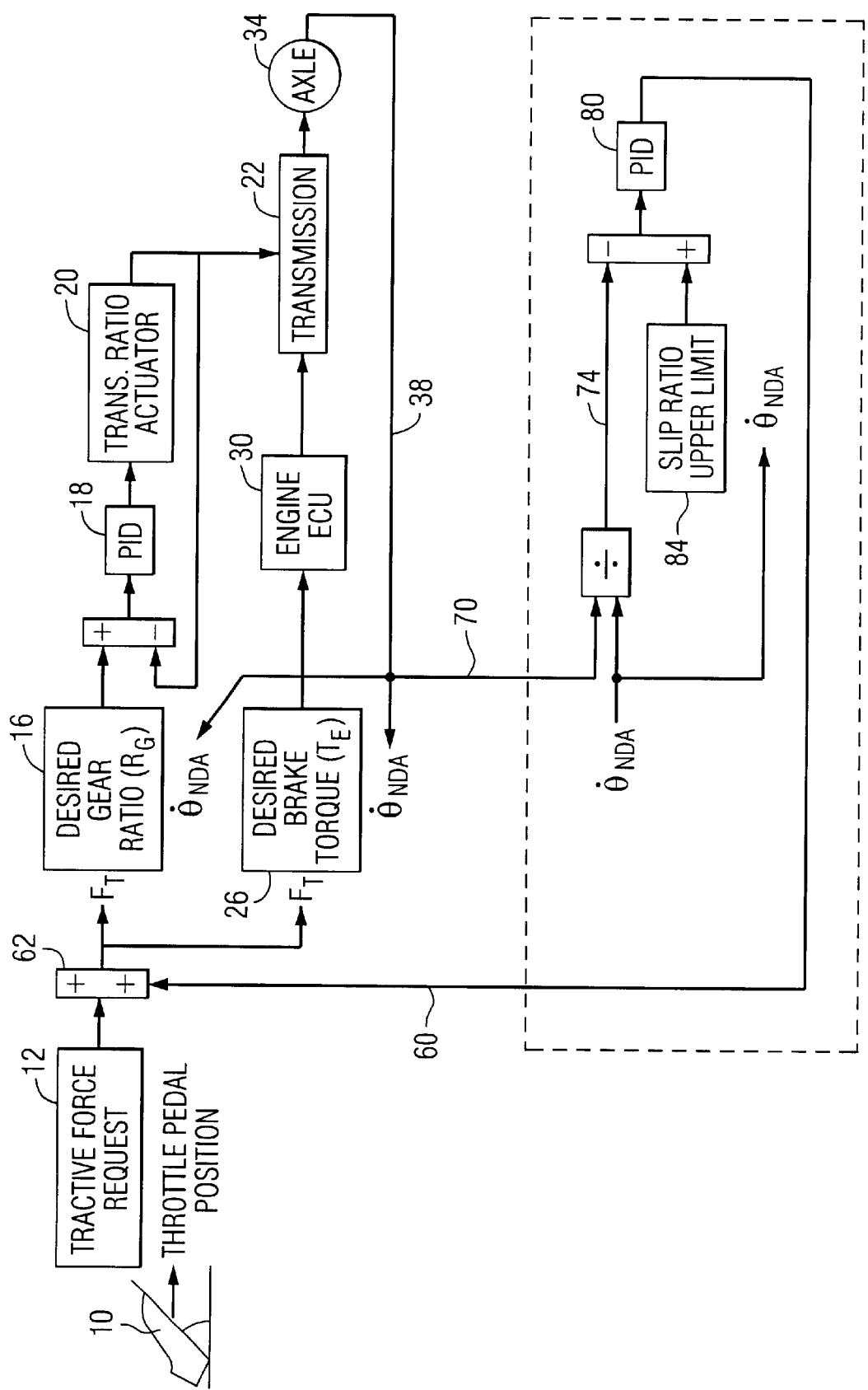
FIG. 2 illustrates an embodiment of the present invention for vehicles which measure ground speed directly.

FIGS. 1 and 2 will present two alternative embodiments of the present invention. It should be recognized that alternative embodiments are also within the scope of the present invention for use with vehicles that have drive train configurations slightly different than the examples that will be used below to describe the two preferred embodiments of the present invention. FIG. 1 illustrates a control scheme for a vehicle that does not have the capability of measuring the actual ground speed. The term "ground speed" is used herein to describe the speed of the vehicle relative to the ground or another stationary object. An example of the type of vehicle with which the control scheme in FIG. 1 is particularly applicable is a vehicle in which all ground contact components (e.g. tires of a four wheel drive vehicle, snowmobile track) are connected in torque transmission with the source of motive power (e.g. an internal combustion engine) of the vehicle. In circumstances like these, it can not be assumed that the rotation of the drive wheels or track perfectly coincides with the speed of the vehicle. In other words, drive wheels can spin on slippery surfaces and the transfer of thrust to the vehicle is less than 100% efficient.

Figure 3:
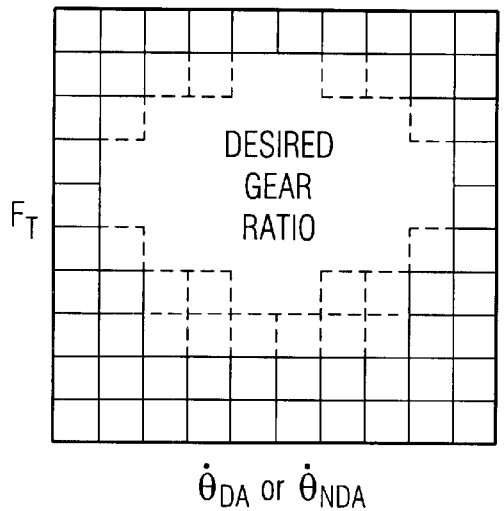
FIGS. 3–6 show various lookup tables which contain desired gear ratio, optimal brake torque, the upper limit for angular acceleration, and a slip ratio limit.
Figure 4:
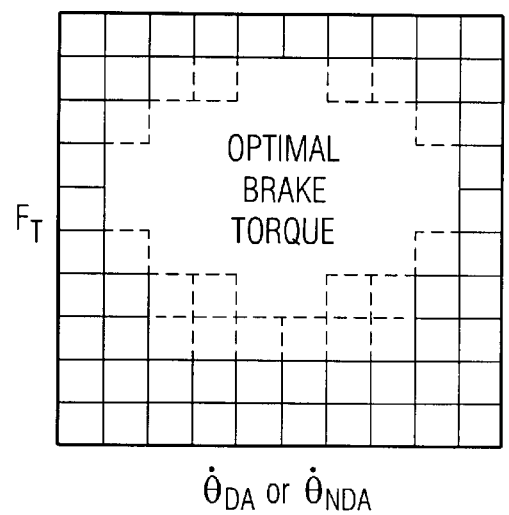

In FIG. 1, a throttle control device, such as a foot pedal 10 is used to provide a tractive force request 12 to the control system. Typically, the tractive force request is directly analogous to the throttle pedal position. Alternatively, a hand grip throttle controller can be used to provide the tractive force request. The tractive force request is used to determine a tractive force command, as will be described in greater detail below. The tractive force command $F_T$ is changed to accommodate changes in the operational characteristics of the ground vehicle. The tractive force command $F_T$ is used to select the desired gear ratio $R_G$ as indicated in functional block 16 of FIG. 1. In a preferred embodiment of the present invention, this step comprises the use of a lookup table, such as a two dimensional matrix, to select the desired gear ratio as a function of the tractive force command $F_T$ and either the angular velocity of a driven axle or a non driven axle. In the example illustrated in FIG. 1, the angular velocity of a driven axle is used. FIG. 3 is an example of how the desired gear ratios for numerous combinations of magnitudes of tractive force command $F_T$ and angular velocity of the driven or non driven shaft. The resolution of the system determines the number of gear ratios stored in the two dimensional matrix. A proportional-integral-differential (PID) control loop is used to select the gear ratio $R_G$. The PID controller 18 operates on the difference between the desired gear ratio $R_G$ and the actual gear ratio until the actual gear ratio, under control of a transmission ratio actuator 20, equals the desired gear ratio $R_G$. The transmission is a continually variable transmission 22 in a preferred embodiment of the present invention. The tractive force command $F_T$ is also used to select a desired engine brake torque $T_E$ as represented by functional block 26. The sample of this type of lookup table is shown in FIG. 4, where a plurality of optimal brake torque magnitudes is stored as a function of the tractive force command $F_T$ and the angular velocity (i.e. the first derivative of $\Theta$) of either the driven axle ($\Theta_{DA}$) or the non driven axle ($\Theta_{NDA}$), depending on the application. The application illustrated in FIG. 1 would use the angular velocity of the driven axle. The desired engine brake torque is then used by an engine controller to determine the operating conditions of an engine 30. In combination with the transmission 22, which is a continually variable transmission, the engine 30 provides the desired engine brake torque to the axle 34. It should be noted that the actual angular velocity of the driven axle is provided, on line 38, so that the two procedure steps relating to functional blocks 16 and 26 can be repeated continuously with updated magnitudes of the angular velocity of the driven axle.

Figure 5:
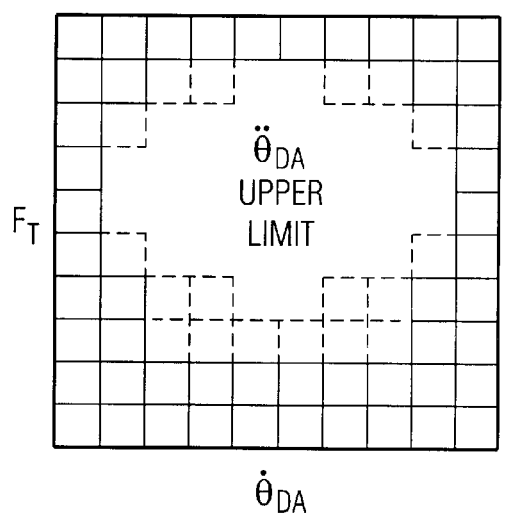

As represented by functional block 40 in FIG. 1, the tractive force request and the angular velocity of the driven axle are used to select an upper limit for the angular acceleration (i.e. the second derivative of $\Theta$) of the driven axle. This is also represented in FIG. 5 where a plurality of angular acceleration upper limits are stored in a two dimensional matrix and selected as a function of the tractive force command $F_T$ and the angular velocity of the driven axle. For these purposes, the angular velocity of the driven axle is provided on line 38 to functional block 40 simultaneously with its provisions to functional blocks 16 and 26. A clock 44 provides periodic signals to a differential calculation step 46 which also receives information relating to the instantaneous angular velocity of the driven axle from line 38. The differential calculation function 46 determines the instantaneous acceleration (i.e. radians per second per second) of the driven axle by monitoring the change if the angular velocity as a function of time and provides this information to a proportional-integral-differential (PID) controller 50 that compares the instantaneous angular acceleration of the driven axle to the upper limit determined from functional block 40. Based on the relative magnitudes of the actual instantaneous angular acceleration of the driven axle and the upper limit for angular acceleration, a signal is provided on line 60 which represents a tractive force command change. In other words, an incremental magnitude is added or subtracted to the tractive force command which was originally equivalent to the tractive force request received from the foot pedal 10 or hand grip throttle. The algebraic addition performed by functional block 62 derives an updated tractive force command which is some fractional portion of the originally received tractive force request provided by functional block 12. This fractional portion, or percentage, can be less than, equal to, or greater than 1.0 in order to accommodate the allowed acceleration upper limit of functional block 40. In other words, the desired gear ratio and the desired engine brake torque will be reselected as a function of the amended tractive force command $F_T$. Most typically, the magnitude of the fractional portion will be less than or equal to unity.

With continued reference to FIG. 1, it can be seen that the control system continually calculates the actual instantaneous angular acceleration of the driven axle at functional block 46 and changes the relationship between the originally received tractive force request 12 and the tractive force command $F_T$ in order to maintain the instantaneous acceleration below the allowable upper limit. In other words, if the drive wheels begin to slip, the present invention will respond to that slippage by immediately decreasing the tractive force command $F_T$. This, in turn, causes the steps illustrated in functional blocks 16 and 26 to reselect the desired gear ratio $R_G$ and the desired engine brake torque $T_E$ based on the new values of the tractive force command $F_T$ and the angular velocity of the driven axle. In practice, the angular acceleration is calculated over a finite period of time. Therefore, it's value may not strictly be an instantaneous value, but its magnitude is adequately representative of the angular acceleration for the purposes of the present invention.

FIG. 2 illustrates the control system of the present invention when applied to a vehicle that provides a measurement of actual ground speed. A vehicle of this type typically has two or more driven wheels connected in torque transmitting relation with the internal combustion engine, or other source of motive power, along with other axles which are not connected in torque transmitting relation with a source of motive power. The non driven axle allows the present invention to measure ground speed more accurately than a vehicle in which all of the axles are driven. The upper portion of FIG. 2 is identical to that of FIG. 1 and will not be described in detail in conjunction with the embodiment of the present invention relating to traction control with ground speed. It should be understood that when both the angular velocity of the driven axle and the non driven axle are available, the desired gear ratio $R_G$ and the desired engine brake torque $T_E$, illustrated in functional blocks 16 and 26, respectively, use the angular velocity of the non driven axle in the steps of selecting the related magnitudes of these variables from the lookup tables illustrated in FIGS. 3 and 4. Conforming with this convention, it should be understood that the representation of the axle 34 in FIG. 2 actually represents both the driven and non driven axles, depending on the particular application, and the angular velocities relating to them.

Figure 6:
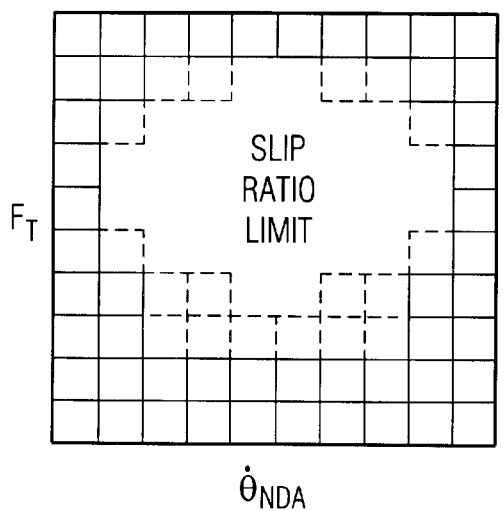

In the lower portion of FIG. 2, the information relating to the angular velocity of the driven axle is provided on line 70 to a divider which divides the angular velocity of the driven axle by the angular velocity of the non driven axle to select a ratio which is then provided, on line 74, to a proportional-integral-differential (PID) controller 80. A slip ratio upper limit, as represented by functional block 84, is selected from a two dimensional matrix such as that illustrated in FIG. 6. The selection of the slip ratio limit is made as a function of the tractive force command $F_T$ and the angular velocity of the non driven axle. If the ratio of the angular velocities of the driven and non driven axles, on line 74, exceed the slip ratio upper limit 84, this indicates that significant slippage is occurring with the driven axle. As a result, the PID controller 80 provides a corrective magnitude on line 60 which decreases the tractive force command $F_T$ as a fractional proportion of the tractive force request 12. As a result, the fractional portion is, by definition, also decreased even though the precise magnitude of the fractional portion may not actually be calculated. Therefore, it can be seen that the fractional portion is changed, either upward or downward, indirectly by changing the magnitude of the tractive force command.

With reference to FIGS. 1–6, it can be seen that the present invention uses predetermined magnitudes of desired gear ratio, optimal brake torque, angular acceleration upper limit, and slip ratio limit to dynamically change the magnitude of the tractive force command, either directly or indirectly, as a fractional portion of the tractive force request. Regardless of the actual manually input tractive force request, the present invention will monitor numerous variables and modify the tractive force command in order to achieve the desired results of the operator of the vehicle.

The method of controlling tractive force of a ground vehicle, in a preferred embodiment of the present invention, comprises the steps of receiving a tractive force command from a foot pedal or hand grip throttle. The present invention then determines a tractive force command as a fractional portion of a tractive force request. If no slippage occurs at the driven axle, the fractional portion of the tractive force request can be 100%. The present invention determines the rotational velocity of a shaft selected from the group consisting of a driven shaft which is connected in torque transmitting relation with a source of motive power or a non driven shaft which is not connected in torque transmitting relation with the source of motive power. This selection will depend on the type of vehicle with which the present invention is used. If a non driven shaft is available, it is preferable to use that shaft to measure rotational velocity. It should be understood that the term "rotational velocity" typically includes the angular velocity of the shaft. However, also within the scope of the present invention are alternative means for measuring velocity that may or may not be directly related to the angular velocity, measured in radians per second, of the shaft. The desired gear ratio is selected to allow the continually variable transmission to be set so that the ratio between the source of motive power and the driveshaft can be controlled. The desired gear ratio is selected as a function of the tractive force command and the rotational velocity magnitude. The optimal brake torque magnitude is selected as a function of the tractive force command and the rotational velocity. The gear ratio is then caused to be generally equal to the desired gear ratio. Similarly, the engine is caused to provide a torque output that is generally equal to the optimal brake torque magnitude. The control of the gear ratio and the engine can be accomplished in several ways within the scope of the present invention. Known control algorithms (e.g. PID) which are well known to those skilled in the art can be used. The present invention is not limited to any particular mechanism for causing the gear ratio and the torque output of the engine to match the desired gear ratio and the optimal brake torque magnitude, respectively.

The present invention determines a magnitude of slip between the ground and a driven member which is connected in torque transmitting relation with the driven shaft or axle. As described in detail above, the magnitude of slip between the ground and the driven member, such as a tire or driving tread can be determined in alternative ways. Two of these alternatives are described above in conjunction with FIGS. 1 and 2. The method of the present invention further comprises the step of changing the fractional portion as a function of the magnitude of slip. The fractional portion is the fraction of the tractive force request that is applied as the tractive force command $F_T$.

The determination of the magnitude of slip can be accomplished by measuring elapsed time and then determining the rotational acceleration of the driven shaft as a function of the rotational velocity of the driven shaft and the elapsed time. When this technique is employed in one of the embodiments of the present invention, it is accompanied by the selection of an upper acceleration limit magnitude as a function of the tractive force command and the rotational velocity of the driven shaft. The upper acceleration limit magnitude is then compared with the rotational acceleration that is calculated and the fractional portion is changed as a function of the relative magnitudes of the rotational acceleration, as calculated, of the driven shaft and the upper acceleration limit magnitude which is selected from predetermined magnitudes in a two dimensional array.

Alternatively, an upper slip limit magnitude can be selected from predetermined data and a slip value can be calculated as a function of the rotational velocity of the driven shaft and the rotational velocity of the non driven shaft. This slip value can then be compared to the upper slip limit magnitude and the fractional portion can be changed as a function of the relative magnitudes of the slip value to the upper slip limit magnitude.

In the description of the present invention with regard to FIGS. 3–6, two dimensional arrays are used to store the predetermined magnitudes of desired gear ratio, optimal brake torque, angular acceleration upper limit, and slip ratio limit. However, it should be understood that is not necessary in all embodiments of the present invention to use two dimensional arrays for these purposes. Alternative data storage techniques can be used in place of the lookup tables. In addition, as described above, the value of the fractional portion is typically a dependant variable that changes as a result of changes made in the magnitude of the tractive force command.

Although the present invention has been described in particular detail and illustrated to show two particularly preferred embodiments, it should be understood that alternative embodiments are also within its scope.

We claim:

1. A method of controlling tractive force of a ground vehicle, comprising the steps of:

receiving a tractive force request;

determining a tractive force command as a fractional portion of said tractive force request;

determining a rotational velocity of a shaft selected from the group consisting of a driven shaft connected in torque transmitting relation with a source of motive power and a nondriven shaft which is not connected in torque transmitting relation with said source of motive power;

selecting a desired gear ratio between said source of motive power and said driven shaft, said desired gear ratio being selected as a function of said tractive force command and said rotational velocity;

selecting an optimal brake torque magnitude as a function of said tractive force command and said rotational velocity;

causing a gear ratio between said source of motive power and said driven shaft of said ground vehicle to be generally equal to said desired gear ratio;

causing said engine to provide a torque output that is generally equal to said optimal brake torque magnitude;

determining a magnitude of slip between the ground and a driven member attached in torque transmitting relation with said driven shaft; and changing said fractional portion as a function of said magnitude of slip.

2. The method of claim 1, wherein:

said optimal brake torque magnitude is selected from a two dimensional array of values arranged as a function of said tractive force command and said rotational velocity.

3. The method of claim 1, further comprising:

measuring elapsed time;

determining a rotational acceleration of said driven shaft as a function of said rotational velocity of said driven shaft and said elapsed time;

selecting an upper acceleration limit magnitude as a function of said tractive force command and said rotational velocity of said driven shaft;

comparing said rotational acceleration of said driven shaft to said upper acceleration limit magnitude; and changing said fractional portion as a function of the relative magnitudes of said rotational acceleration of said driven shaft and said upper acceleration limit magnitude.

4. The method of claim 1, wherein:

said desired gear ratio is selected from a two dimensional array of values arranged as a function of said tractive force command and said rotational velocity.

5. The method of claim 1, wherein:

said magnitude of slip determining step comprises the steps of determining a rotational velocity of said driven shaft and determining a rotational velocity of said nondriven shaft.

6. The method of claim 5, further comprising:

selecting an upper slip limit magnitude as a function of said tractive force command and said rotational velocity of said nondriven shaft;

calculating a slip value as a function of said rotational velocity of said driven shaft and said rotational velocity of said nondriven shaft;

comparing said slip value to said upper slip limit magnitude; and changing said fractional portion as a function of the relative magnitudes of said slip value to said upper slip limit magnitude.

7. The method of claim 3, wherein:

said upper acceleration limit magnitude is selected from a two dimensional array of values arranged as a function of said tractive force command and said rotational velocity.

8. The method of claim 6, wherein:

said upper slip limit magnitude is selected from a two dimensional array of values arranged as a function of said tractive force command and said rotational velocity.

9. The method of claim 1, wherein:

said tractive force request is representative of a foot controlled accelerator pedal.

10. A method of controlling tractive force of a ground vehicle, comprising the steps of:

receiving a tractive force request;

determining a tractive force command as a fractional portion of said tractive force request;

determining a rotational velocity of a driven shaft connected in torque transmitting relation with a source of motive power;

selecting a desired gear ratio between said source of motive power and said driven shaft, said desired gear ratio being selected as a function of said tractive force command and said rotational velocity;

selecting an optimal brake torque magnitude as a function of said tractive force command and said rotational velocity;

causing a gear ratio between said source of motive power and said driven shaft of said ground vehicle to be generally equal to said desired gear ratio;

causing said engine to provide a torque output that is generally equal to said optimal brake torque magnitude;

determining a magnitude of slip between the ground and a driven member attached in torque transmitting relation with said driven shaft;

changing said fractional portion as a function of said magnitude of slip;

measuring elapsed time;

determining a rotational acceleration of said driven shaft as a function of said rotational velocity of said driven shaft and said elapsed time.

11. The method of claim 10, further comprising:

selecting an upper acceleration limit magnitude as a function of said tractive force command and said rotational velocity of said driven shaft;

comparing said rotational acceleration of said driven shaft to said upper acceleration limit magnitude; and changing said fractional portion as a function of the relative magnitudes of said rotational acceleration of said driven shaft and said upper acceleration limit magnitude.

12. The method of claim 11, wherein:

determining a rotational velocity of a nondriven shaft.

13. The method of claim 12, further comprising:

selecting an upper slip limit magnitude as a function of said tractive force command and said rotational velocity of said nondriven shaft.

14. The method of claim 13, further comprising:

calculating a slip value as a function of said rotational velocity of said driven shaft and said rotational velocity of said nondriven shaft.

15. The method of claim 14, further comprising:

comparing said slip value to said upper slip limit magnitude; and changing said fractional portion as a function of the relative magnitudes of said slip value to said upper slip limit magnitude.

16. The method of claim 15, wherein:

said tractive force request is representative of a foot controlled accelerator pedal.

17. A method of controlling tractive force of a ground vehicle, comprising the steps of:

receiving a tractive force request;

determining a tractive force command as a fractional portion of said tractive force request;

determining a rotational velocity of a driven shaft connected in torque transmitting relation with a source of motive power;

determining a rotational velocity of a nondriven shaft which is not connected in torque transmitting relation with said source of motive power;

selecting a desired gear ratio between said source of motive power and said driven shaft, said desired gear ratio being selected as a function of said tractive force command and said rotational velocity;

selecting an optimal brake torque magnitude as a function of said tractive force command and said rotational velocity;

causing a gear ratio between said source of motive power and said driven shaft of said ground vehicle to be generally equal to said desired gear ratio;

causing said engine to provide a torque output that is generally equal to said optimal brake torque magnitude;

determining a magnitude of slip between the ground and a driven member attached in torque transmitting relation with said driven shaft; and changing said fractional portion as a function of said magnitude of slip.

18. The method of claim 17, further comprising:

measuring elapsed time;

determining a rotational acceleration of said driven shaft as a function of said rotational velocity of said driven shaft and said elapsed time;

selecting an upper acceleration limit magnitude as a function of said tractive force command and said rotational velocity of said driven shaft;

comparing said rotational acceleration of said driven shaft to said upper acceleration limit magnitude; and changing said fractional portion as a function of the relative magnitudes of said rotational acceleration of said driven shaft and said upper acceleration limit magnitude.

19. The method of claim 18, further comprising:

selecting an upper slip limit magnitude as a function of said tractive force command and said rotational velocity of said nondriven shaft.

20. The method of claim 19, further comprising:

calculating a slip value as a function of said rotational velocity of said driven shaft and said rotational velocity of said nondriven shaft;

comparing said slip value to said upper slip limit magnitude; and changing said fractional portion as a function of the relative magnitudes of said slip value to said upper slip limit magnitude.

* * * * *